(12) United States Patent
Kudalippalliyalil et al.

(10) Patent No.: US 12,360,319 B2
(45) Date of Patent: Jul. 15, 2025

(54) ELECTRO-OPTIC FREQUENCY TRANSDUCER USING COUPLED MICRODISK RESONATORS

(71) Applicant: University of Southern California, Los Angeles, CA (US)

(72) Inventors: Ramesh Kudalippalliyalil, Los Angeles, CA (US); Sujith Chandran, Los Angeles, CA (US); Akhilesh Jaiswal, Los Angeles, CA (US); Ajey P. Jacob, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 280 days.

(21) Appl. No.: 18/073,321

(22) Filed: Dec. 1, 2022

(65) Prior Publication Data
US 2023/0314717 A1 Oct. 5, 2023

Related U.S. Application Data

(60) Provisional application No. 63/285,413, filed on Dec. 2, 2021.

(51) Int. Cl.
*G02B 6/12* (2006.01)
*G02B 6/293* (2006.01)
*G02F 3/00* (2006.01)
*G06N 10/40* (2022.01)

(52) U.S. Cl.
CPC ..... *G02B 6/29341* (2013.01); *G02B 6/12004* (2013.01); *G02F 3/00* (2013.01); *G06N 10/40* (2022.01); *G02F 2203/15* (2013.01)

(58) Field of Classification Search
CPC ... G02B 6/12004; G02B 6/29341; G02F 3/00; G02F 2203/15; G06N 10/40
See application file for complete search history.

(56) References Cited

U.S. PATENT DOCUMENTS

| | | | |
|---|---|---|---|
| 9,350,460 B2 * | 5/2016 | Paik | B82Y 10/00 |
| 10,295,582 B2 * | 5/2019 | Bishop | G01R 29/0892 |
| 10,372,014 B1 * | 8/2019 | Vidrighin | G02F 1/3536 |
| 11,092,873 B1 * | 8/2021 | Loncar | G02F 2/02 |
| 11,429,009 B2 * | 8/2022 | Zhang | G02B 6/29343 |
| 2018/0113373 A1 | 4/2018 | Witmer et al. | |
| 2020/0064419 A1 | 2/2020 | Barry et al. | |

(Continued)

OTHER PUBLICATIONS

Gambetta, Jay M. et al., "Building logical qubits in a superconducting quantum computing system", npj Quantum Information, Jan. 13, 2017, pp. 1-7, vol. 3, Article 2.

(Continued)

*Primary Examiner* — Ryan A Lepisto
(74) *Attorney, Agent, or Firm* — Pillsbury Winthrop Shaw Pittman LLP

(57) ABSTRACT

Provided is an electro-optic transducer comprising: a first optical disk resonator and a second optical disk resonator, wherein the first optical disk resonator and the second optical disk resonator are optically coupled; a waveguide, the waveguide optically coupled to at least one of the first optical disk resonator and the second optical disk resonator; and a resonator, the resonator functionally coupled to at least a portion of the first optical disk resonator and the second optical disk resonator.

19 Claims, 7 Drawing Sheets

(56) References Cited

U.S. PATENT DOCUMENTS

2022/0222567 A1\* 7/2022 Reagor ............... G01B 9/0203

OTHER PUBLICATIONS

Bardin, Joseph C. et al., "Microwaves in Quantum Computing", IEEE Journal of Microwaves, Jan. 7, 2021, pp. 403-427, vol. 1, Issue 1.

Eichler, C. et al., "Observation of Entanglement between Itinerant Microwave Photons and a Superconducting Qubit", Phys. Rev. Lett. 109, Sep. 3, 2012, pp. 1-5, vol. 109, Issue 24.

Soltani, Mohammad et al., "Efficient quantum microwave-to-optical conversion using electro-optic nanophotonic coupled resonators", Phys. Rev. A 96, Nov. 11, 2017, pp. 1-10, vol. 96, Issue 4.

Fan, Linran et al., "Superconducting cavity electro-optics: A platform for coherent photon conversion between superconducting and photonic circuits", Science Advances, Aug. 17, 2018, pp. 1-6, vol. 4, Issue 8.

Fu, Yu et al., "Bilinear magnetoresistance in HgTe topological insulator: opposite signs at opposite interfaces demonstrated by gate control", arXiv preprint arXiv:2111.15594, dated Feb. 14, 2023, pp. 1-7.

Holzgrafe, Jeffrey et al., "Cavity electro-optics in thin-film lithium niobate for efficient microwave-to-optical transduction", Optica Publishing Group, Dec. 7, 2020, pp. 1714-1720, vol. 7, Issue 12.

Xiang, Ze-Liang, et al., "Hybrid quantum circuits: Superconducting circuits interacting with other quantum systems", Reviews of Modern Physics, Apr. 10, 2013, pp. 1-35, vol. 85, Issue 2.

Schoelkopf, R.J. et al., "Wiring up quantum systems", Nature, Feb. 7, 2008, pp. 664-669, vol. 451.

Han, Xu et al., "Microwave-optical quantum frequency conversion", Optica Publishing Group, Aug. 2, 2021, pp. 1050-1064, vol. 8, Issue 8.

Lambert, Nicholas J. et al., "Coherent conversion between microwave and optical photons—an overview of physical implementations", Advanced Quantum Technologies, Dec. 12, 2019, pp. 1-15, vol. 3, Issue 1.

Li, Bo et al., "Tunable Autler—Townes splitting observation in coupled whispering gallery mode resonators", IEEE Photonics Journal (4501910), Sep. 20, 2016, pp. 1-11, vol. 8, Issue 5.

Rueda, Alfredo, et al., "Efficient microwave to optical photon conversion: an electro-optical realization", Optica Publishing Group, Jun. 6, 2016, pp. 597-604, vol. 3, Issue 6.

Rueda, Alfredo, et al., "Electro-optic entanglement source for microwave to telecom quantum state transfer", npj Quantum Information, Nov. 28, 2019, pp. 1-11, vol. 5, Issue 1, Article No. 108.

Witmer, Jeremy D. et al., "On-Chip Microwave-to-Optical Photon Conversion for Quantum Networks", Quantum Information and Measurement (QIM) V: Quantum Technologies, Apr. 4, 2019, pp. 1-2, Optica Publishing Group.

Xu, Yuntao, et al., "Bidirectional interconversion of microwave and light with thin-film lithium niobate", Nature Communications, Jul. 22, 2021, pp. 1-7, vol. 12, Issue 1, Article No. 4453.

Lauk, Nikolai et al., "Perspectives on quantum transduction", Quantum Science and Technology, Mar. 17, 2020, pp. 1-16, vol. 5, Issue 2, IOP Publishing Ltd.

\* cited by examiner

ELECTRO-OPTIC FREQUENCY TRANSDUCER USING COUPLED MICRODISK RESONATORS

CROSS-REFERENCE TO RELATED APPLICATIONS

This application claims the benefit of U.S. Provisional Application 63/285,413, titled "A COUPLED MICRODISK RESONATOR BASED ELECTRO-OPTIC TRANSDUCER FOR QUANTUM FREQUENCY CONVERSION," filed 2 Dec. 2021. The entire contents of each afore-mentioned patent filing is hereby incorporated by reference.

GOVERNMENT LICENSE RIGHTS

This invention was made with government support under grant number 2040737 awarded by the National Science Foundation (NSF). The government has certain rights in the invention.

BACKGROUND

Quantum computing entails using devices to harness quantum mechanical principles to process information, for example through superposition, entanglement, etc. Quantum computing devices may operate based on quantum bits or "qubits." Qubits store quantum information, which may be used in quantum processing, the results of which may be read as output. Types of qubits include superconducting qubits, photonic qubits, trapped ions qubits, etc. Networking and reading of different quantum computing devices (for example, qubits) can be accomplished in various ways, depending on the type of qubit.

SUMMARY

The following is a non-exhaustive listing of some aspects of the present techniques. These and other aspects are described in the following disclosure.

Some aspects relate to an electro-optic transducer, which may comprise a first optical disk resonator and a second optical disk resonator, wherein the first optical disk resonator and the second optical disk resonator are optically coupled; a waveguide, the waveguide optically coupled to at least one of the first optical disk resonator and the second optical disk resonator; and a resonator, the resonator functionally coupled to at least a portion of the first optical disk resonator and the second optical disk resonator Some aspects relate to determining an output of a superconducting qubit, which may comprise providing, by a waveguide, an optical frequency, to a first optical disk resonator, wherein the first optical disk resonator is optically coupled to a second optical disk resonator, wherein the first optical disk resonator and the second optical disk resonator have substantially similar resonant frequencies wo, and wherein the first optical disk resonator and the second optical disk resonator are functionally coupled to a microwave resonator; detecting, via the waveguide, output of the first optical disk resonator; and determining, based on the output, a microwave frequency $\Omega_M$ applied to the microwave resonator.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
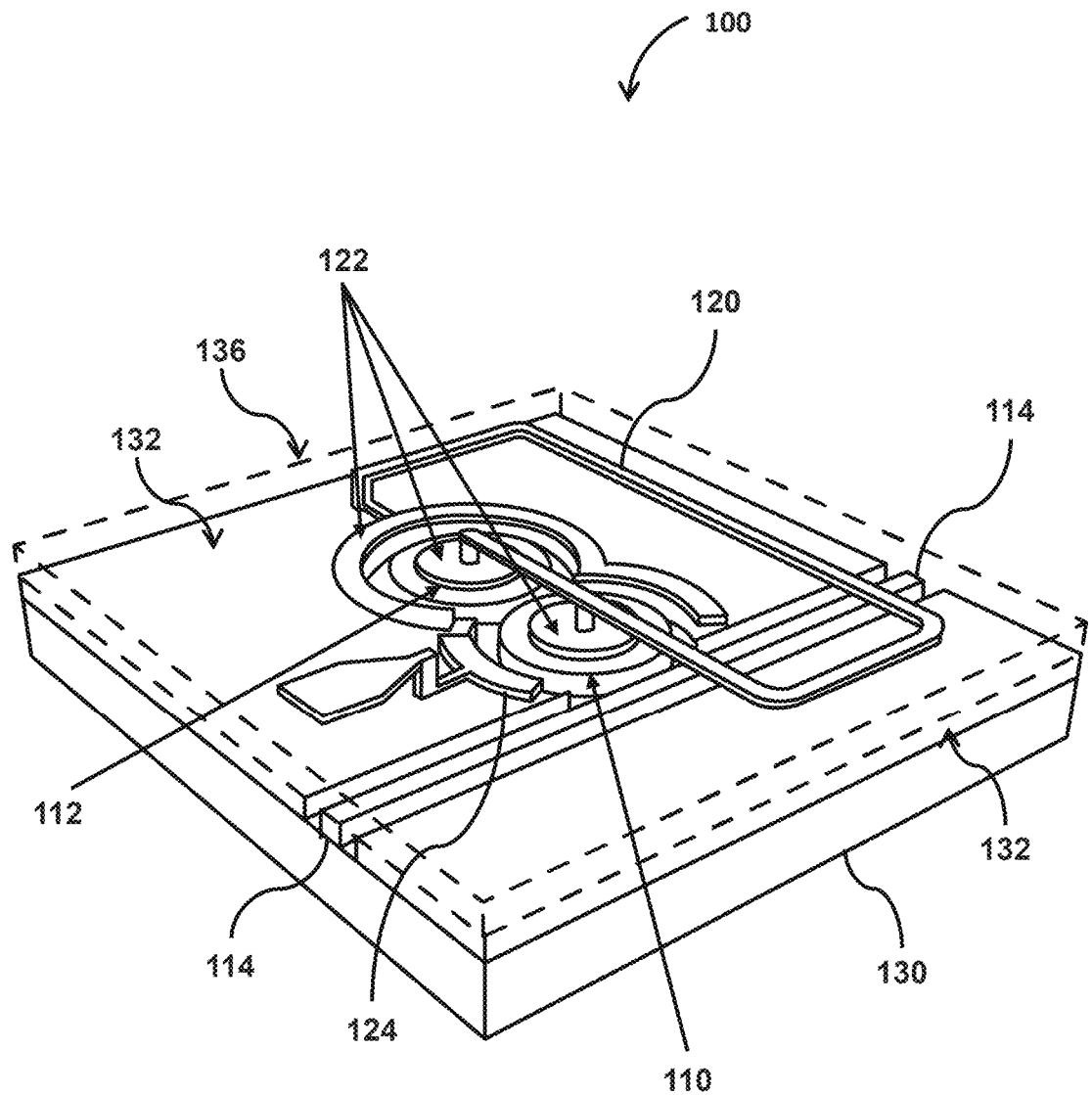
FIG. 1 is a schematic diagram that illustrates a view of an example electro-optic (EO) transducer, in accordance with one or more embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of quantum computing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Quantum frequency transducers may be used for interconnecting of different quantum devices via optical fibers, e.g., for the coherent conversion between superconducting microwave photons and optical photons in telecommunication wavelengths. Among several approaches for quantum transduction, including opto-mechanics, magnonics, and piezo-mechanics, the electro-optic (EO) quantum transducers based on Pockels effect may be more promising for large-scale integration, as these devices may be mechanically and thermally stable, electrically tunable and may be integrated with superconducting circuits. EO frequency mixing generally employs a superconducting microwave resonator (resonance at $\Omega_M$) coupled to an optical resonator with large EO coefficient (such as lithium niobate, aluminum nitride and barium titanate, etc.). The optical resonators may be designed to support both pump (@p) and generated sideband (sum and/or difference) frequencies ($\omega_s=\omega_p\pm\Omega_M$). Many of the previously noted approaches are based on coupled ring resonator devices exhibiting double optical resonance due to electromagnetically induced transparency (ET). Such devices may be capable of suppressing undesired sidebands, e.g., capable of suppressing the down converted signal in the up-conversion (microwave-to-optical) process. However, these devices typically occupy a large footprint 500 μm² to 1 mm² and may have conversion efficiency below 2%. These devices may also exhibit large optical insertion loss due to the sidewall roughness of the ring waveguides. It should be emphasized that the discussion of tradeoffs in various techniques discussed herein should not be read as a disclaimer or disavowal of systems using techniques described as having disadvantages or being disfavored.

In contrast to larger ring resonators, whispering gallery mode resonators (WGM) may be compact and may provide a larger Q-factor due to their smaller mode volume. Some embodiments include quantum frequency transducer based on WGM coupled disk resonators integrated with superconducting microwave resonators. In some embodiments, the optical cavity may generate high Q-factor split resonances on the order of $10^6$-$10^7$ by Autler-Townes splitting (ATS) phenomena with a free spectral range in the microwave frequency range.

FIG. 1 is an orthogonal perspective view of a of an example electro-optic (EO) transducer 100. FIG. 1 depicts an example EO transducer 100 containing a first disk resonator 110 and a second disk resonator 112. The first disk resonator 110 may be optically coupled to a waveguide 114. A capacitor 122 may be coupled with the first disk resonator 110 and the second disk resonator 112. An inductor 120 may be electrically coupled with the capacitor 122. A bias capacitor 124 may also be coupled with at least one of the first disk resonator 110 and the second disk resonator 112. The EO transducer is depicted as being fabricated on a substrate 130 and as including an optical layer 132 and a cap layer 136. The optical layer 132 may be patterned and may include the first disk resonator 110 and the second disk resonator 112. The cap layer 136 may separate the first disk resonator 110 and the second disk resonator 112 from the inductor 120.

In some embodiments, the EO transducer, as shown in FIG. 1, may be based on two coupled WGM disk resonators (D1 and D2) (e.g., the first disk resonator 110 and the second disk resonator 112), where one of the disks (D1) (e.g., the first disk resonator 110) may be coupled to an input/output bus waveguide (e.g., the waveguide 114). When both the disk resonators have substantially identical intrinsic resonance condition (e.g., resonant frequency, $\omega_1=\omega_2=\omega_0$ where $\omega_1$ is the resonance frequency of the first disk resonator 110 and $\omega_2$ is the resonance frequency of the second disk resonator 112 and quality factor, $Q_1=Q_2=Q_0$ where $Q_1$ is the quality factor of the first disk resonator 110 and $Q_2$ is the quality factor of the second disk resonator 112) and strongly coupled, (extrinsic Q factor $Q_c \ll Q_0$), the optical transmission characteristics may show two substantially identical split resonances (e.g., due to ATS resonance splitting) at such as at resonance frequencies $\omega_l$ (e.g., a lower resonance frequency) and $\omega_u$ (e.g., an upper resonance frequency), which may be centered at $\omega_0$. The split resonance characteristics may be exploited to produce an EO microwave-to-optical frequency converter, which may operate through a non-linear sum frequency generation process. In the non-linear sum frequency generation process, the optical free spectral range (FSR) (e.g., the FSR=$\omega_u-\omega_l$) may be detuned by the input microwave frequency $\Omega_M$ to generate a split resonance given by the relationship $\omega_u=\omega_l\pm\Omega_M$.

Figure 2:
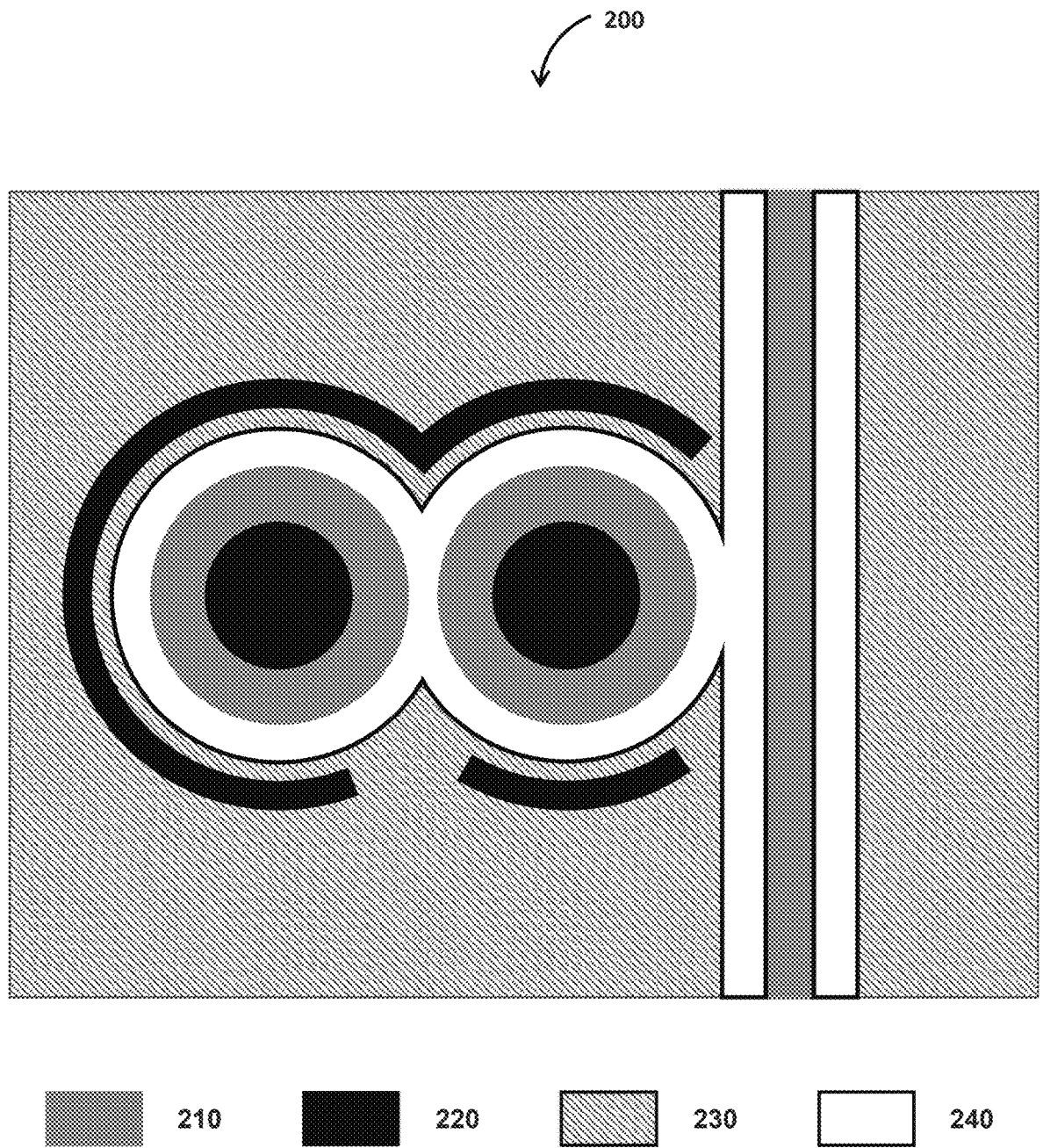
FIG. 2 is a schematic diagram that illustrates a planar view of an example EO transducer, in accordance with one or more embodiments.

FIG. 2 is a schematic diagram that illustrates a plan view of an example EO transducer 200, such as the example EO transducer of FIG. 1. FIG. 2 depicts the planar view of the example EO transducer 200 from a perspective perpendicular to a plane of a substrate 230. The substrate 230 may include an optical layer 210 containing a first disk resonator (e.g., the first disk resonator 110 of FIG. 1) and a second disk resonator (e.g., the second disk resonator 112 of FIG. 1) and a waveguide (e.g., the waveguide 114 of FIG. 1). The optical layer 210 may be fabricated on top of the substrate, on top of another fabricated layer supporting by the substrate (e.g., on top of silicon-on-silicon-dioxide (Si on $SiO_2$)), recessed within the substrate, etc. The substrate 230 may include a microwave layer 220. The microwave layer 220 may include a capacitor (e.g., one or more electrodes of a capacitor), such as a capacitor electrically coupled to at least one of the first disk resonator and the second disk resonator. The microwave layer 220 may also include a bias capacitor (e.g., the bias capacitor 124 of FIG. 1). The microwave layer 220 may be fabricated on top of the optical layer 210, beneath the optical layer 210, separated from the optical layer 210 by a cladding layer (e.g., a passivation layer, a separation layer, etc.). The substrate 230 may include one or more microwave layers, for example, a first microwave layer containing electrodes of one or more capacitor and a second microwave layer containing contact lines connecting those electrodes of the first microwave layer. The one or more microwave layers may be separated by intervening layers, including cladding layers. The substrate 230 may include a fill layer 240, where the void layer may correspond to etched portions of the optical layer 210. The fill layer 240 may be filled by a different substance than that which comprises the optical layer 210. The fill layer 240 may instead be—or partially be—a void space or void layer.

Figure 3:
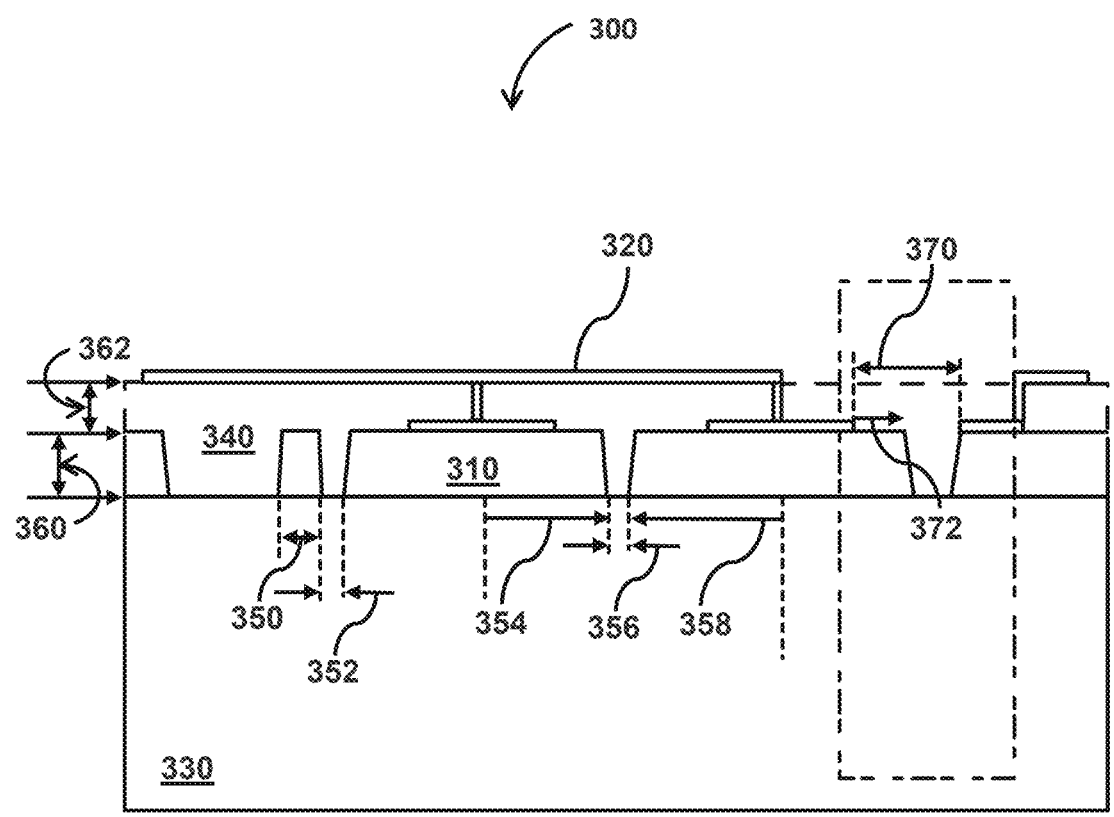
FIG. 3 is a schematic diagram that illustrates a cross-sectional view of an example EO transducer, in accordance with one or more embodiments.

FIG. 3 is a cross-sectional elevation view of an example EO transducer 300, such as the example EO transducer of FIG. 1. FIG. 3 depicts the example EO transducer from along a plane between of a first disk resonator (e.g., the first disk resonator 110 of FIG. 1) and of a second disk resonator (e.g., the second disk resonator 112 of FIG. 2). The example EO transducer may be supported by a substrate 330 and may include an optical layer 310, a cladding layer 340, and a microwave layer(s) 320. The optical layer 310 may include a waveguide of width 350, a first optical disk resonator of radius 354, wherein the first optical disk resonator is separated from the waveguide by a distance 352, and a second optical disk resonator of radius 358, wherein the second optical disk resonator is separated from the first optical disk resonator by a distance 356. The optical layer 310 may have a thickness 360, wherein the features of the optical layer 310 (such as the first disk resonator, the second disk resonator, the waveguide, etc.) may be defined by regions where the optical layer is absent (e.g., etched or otherwise removed or masked). The cladding layer 340 may have a thickness 362, wherein the cladding layer is of thickness 362 in regions on top of features of the optical layer 310 and wherein the cladding layer 340 is of thickness 360 in addition to thickness 362 in regions where the optical layer 310 is absent. The microwave layer 320 may include electrodes (e.g., of the capacitor 122 of FIG. 1) applied on top of the first disk resonator and the second disk resonator and on top of a portion of the optical layer 310 in the bulk. The microwave layer 320 may have electrical connections between the electrodes, such as may be provided by through silicon vias, and a portion of the microwave layer on top of the cladding layer 340 (for example, the portion of the microwave layer 320 on top of the cladding layer 340 may correspond to the inductor 120 of FIG. 1). The electrodes of the microwave layer may be separated by a distance 370, here depicted as the distance separating the second disk resonator and bulk of the optical layer 310. The first disk resonator and the second disk resonator may be separated from the bulk of the optical layer 310 by a distance 372, which may be different than the distance 370.

In some embodiments, the optical waveguides and disk resonators may be fabricated on 750 nm thick aluminum nitride (AlN) that has an EO coefficient 1 pm/V, on a sapphire substrate with $SiO_2$ as a top cladding. A superconducting (for example, Nb or NbN) microwave resonator (which may be an inductor capacitor (e.g., LC) resonator) at tuned to a frequency of $\Omega_M$~6-8 GHz (e.g., a frequency which corresponds to superconducting qubits, like transmons, fluxmons, xmons, ets.) may be integrated above the disk resonators. The capacitor electrodes may be placed directly on top of the AlN layer, while the inductor (which may be considered a lumped inductor) may be placed above the $SiO_2$ cladding connected to the capacitor electrodes through vias. This configuration may allow for fundamental WGM operation where higher-order modes may be eliminated by the presence of the inner capacitor electrode. Additionally, a bias capacitor may also provided to detune the optical characteristics electrically.

A calculated cross-sectional field distribution of the fundamental WGM transverse electrical (TE) mode (e.g., where $|E_x|^2>>|E_y|^2$) may be calculated, where the field distribution may be concentrated within the disk resonators between the edge of the disk resonator and the edge of the capacitor electrode. A minimum separation between the capacitor electrodes may be estimated to be s=2.5 µm, which may minimize insertion loss due to mode overlap with the conductor (e.g., metal of the capacitor electrode). Similarly, the minimum thickness of $SiO_2$ top cladding above the waveguide may be $t_c$=400 nm. (Reference to "minimums" and "maximums" should be read as pertaining to the embodiment at issue, rather than as absolutes beyond which subject matter is disclaimed or disavowed.) A corresponding electric potential distribution and electric field lines of the microwave capacitor may be determined. The electric field lines may be nearly parallel to the optical TE mode, which may in turn enhance the microwave-optical interaction.

Figure 4A:
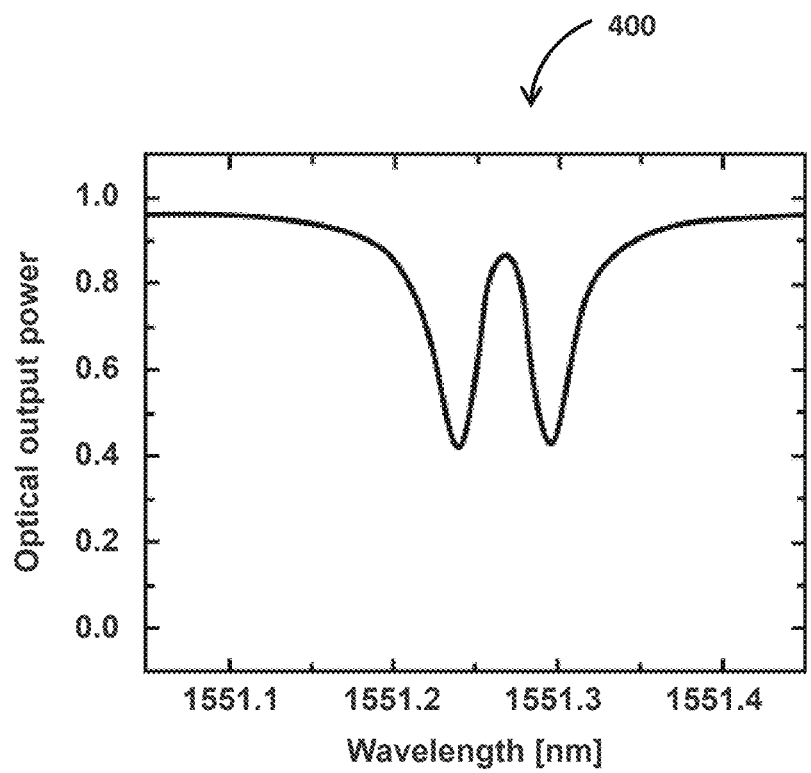
FIG. 4A-4B are graphs that illustrate coupling between microwave and optical transmissions in an example EO transducer, in accordance with one or more embodiment.
Figure 4B:
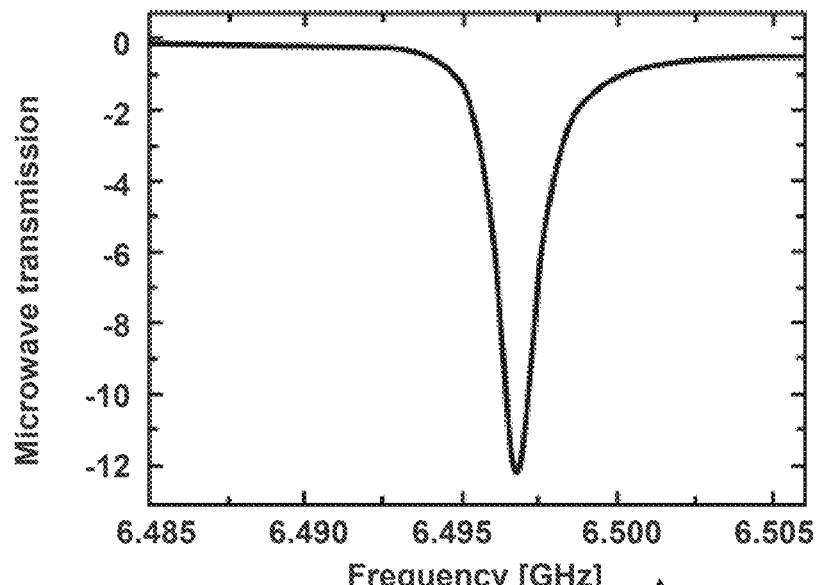

FIG. 4A-4B are graphs that illustrate coupling between microwave and optical transmissions in an example EO transducer. FIG. 4A contains a graph 400, which shows optical split resonance characteristics at an output port (e.g., of the optical waveguide) for an example EO transducer where the first disk resonator and the second disk resonator have equal radii given by $R_1=R_2$=30 µm, and wherein the gap between the waveguide and the first disk resonator and the gap between the first disk resonator and the second disk resonator are equal and given by $G_1=G_2$=400 nm, and wherein an operating wavelength (e.g., a wavelength corresponding to the pump frequency and/or a wavelength supplied by the waveguide) is given by λ~1550 nm. The optical FSR may be calculated to be ~6.45 GHz which may nearly equal to a resonant frequency of a corresponding microwave resonator. FIG. 4B contains a graph 450, which shows the resonance frequency of a microwave resonator, correspond to the optical split resonance characteristics of FIG. 4A, which shows the relationship between optical and microwave resonance. In the example EO transducer of FIG. 4A (and FIG. 4B), the optical input pump is set at $\omega_l$, and therefore generates optical photons at du via the optical split resonance. The EO coupling rate (g-factor) may be governed by the equation 1, below:

$$g = \frac{r\mathcal{E}_p \omega_p}{V_p} \sqrt{\frac{\hbar \Omega_M}{8\mathcal{E}_0 \mathcal{E}_M V_\Omega}} \int_V \Psi_M |\Psi_p|^2 dV \quad (1)$$

where r is the EO coefficient of AlN, $\xi_{p,M}$ are dielectric constants, $V_{p,M,\Omega}$ are mode volumes, and $\Psi_{p,M}$ are the normalized field distribution across the optical waveguide, where p and M represent the optical and microwave fields, respectively (where, $\omega_p \approx \omega_u$) and $V_r \approx V_p$). The g-factor of the example EO transducer (e.g., of FIGS. 4A and 4B) is calculated to be 7.35 kHz (g/2π=1.17 kHz), where the microwave capacitor is assumed to cover half of the total perimeter of the device (e.g., half of the total perimeter of the first disk resonator and the second disk resonator). The coupling rate may be further improved by changing locations and/or geometry of the microwave capacitor electrodes to adjust optical and microwave mode overlap.

An internal conversion efficiency ($\eta_i$) and extraction efficiency ($\eta_e$) of an EO transducer may be expressed as equation 2, below:

$$\eta_i = \frac{4C}{(1+C)^2} \text{ and } \eta_e = \frac{Q_{opt} Q_M}{Q_{ext,opt} Q_{ext,M}} \quad (2)$$

respectively. The cooperativity factor C may be given by $c=4g^2 N_s Q_{opt} Q_M / \omega_p \Omega_M$ where $N_s$ is the total number of pump photons inside the resonator, and $Q_{opt}$ and $Q_M$ are the loaded Q factors of the optical and microwave resonators, respectively. The loaded Q may be a function of extrinsic and intrinsic Q factors, and may be represented as $Q^{-1}=Q_{int}^{-1}+Q_{ext}^{-1}$. Assuming the disk resonator D1 is overcoupled, e.g., $Q_{ext,opt}<Q_{int,opt}$, $Q_{int,opt}=1\times10^7$ and $Q_{ext,M}=Q_{int,M}=2\times Q_M$, (where $Q_M$ may be given by $Q_M$=5900), C, $\eta_e$ and $\eta_i$ may be calculated as a function $Q_{ext,opt}/Q_{ing,opt}$ and input pump power $P_{pump}$. A net conversion efficiency may be given by $\eta=\eta_i \times \eta_e$.

A finite-difference time-domain (FDTD) simulated loaded optical Q-factor of the EO transducer of FIGS. 4A and 4B may be calculated as $Q_{opt}=\lambda_r/\Delta\lambda$=~1.1×10$^5$ where Δλ corresponds to the 3-dB bandwidth of the optical resonance and $\lambda_r$ corresponds to the center wavelength. Similarly, the loaded Q of the microwave resonator (of the EO transducer of FIGS. 4A and 4B) may be calculated as $Q_M$=5900. Using an assumptions of $Q_{int,opt}=1\times10^7$ and substituting the simulated $Q_{opt}=1.1\times10^5$, in above calculations, $\eta_e$, $\eta_i$ and η may be determined to be ~50%, ~0.6% and ~0.3%, respectively, at pump power $P_{pump}$=150 µW. These values may be calculated based on an underestimated $Q_{opt}$~1.1×10$^5$, which is limited by FDTD simulation time and memory. In some embodiments, it may be expected that the actual loaded Q factor of the example EO transducer may be in the range of ~10$^6$. In order to obtain the desired optical ATS characteristics, the example EO transducer may be optimized about $Q_{ext,opt}=0.1\times Q_{int,opt}$. In some embodiments, it may be important to minimize the optical pump power (e.g., as low as feasible based on physical, measurement, etc. constraints) in order to minimize the noise and the scattered power. Based on simulations, it is expected that n may be above 13% ($\eta_e$=46%, $\eta_i$=28%) when $Q_{opt} \rightarrow 9\times10^5$ and $Q_{ext,opt}/Q_{int,opt}$~0.11 at $P_{pump}$~150 µW.

In some embodiments, a coupled disk resonator-based EO transducer is provided for quantum microwave-to-optical frequency conversion. A calculated g-factor maybe be 7.35 kHz, which may be improved further by optimizing the location and geometry of the microwave capacitor electrodes and/or choosing the appropriate optical mode. A conversion efficiency may also be determined as a function of $Q_{ext,opt}/Q_{int,opt}$ and optical input pump power. In some embodiments, the proposed device (e.g., the example EO transducer) may provide conversion efficiency above 13% at a very low input pump power level ~150 µW, provided the loaded optical Q factor is in the order of $10^6$.

Figure 5:
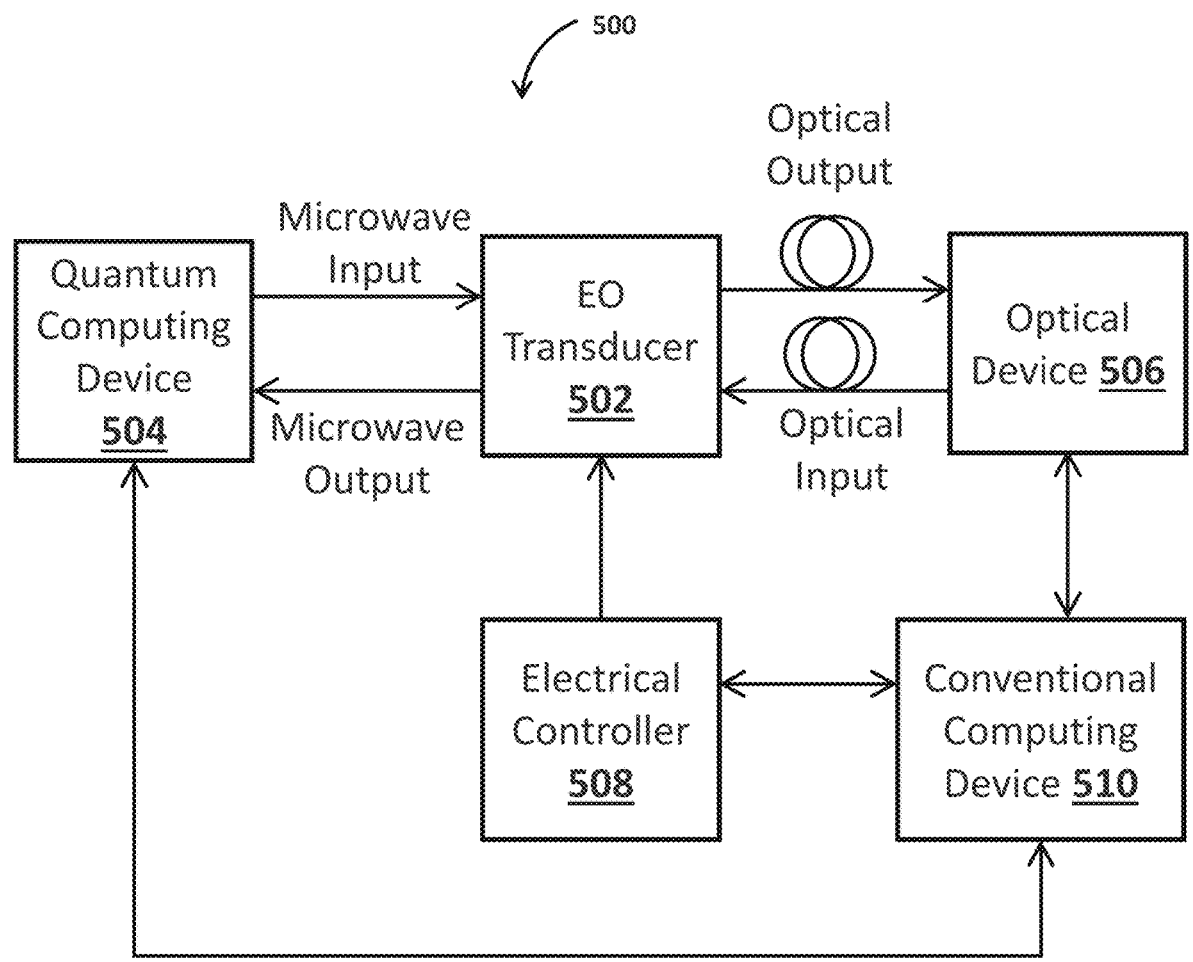
FIG. 5 is a system diagram that illustrates an example quantum computing system including an example EO transducer, in accordance with one or more embodiments.

FIG. 5 is a system diagram 500 that illustrates an example quantum computing system including an example EO transducer. FIG. 5 includes an EO transducer 502 (e.g., an example EO transducer of any of FIGS. 1, 2, 3, and 4A-4B), a quantum computing device 504, an optical device 506, an electrical controller 508, and a computing device 510, such as a digital computing device 700 described below that operates on bits rather than qbits. The EO transducer may exchange optical input and output optical with the optical device 506. The optical device 506—for example, an optical source and/or optical detector—may produce optical input to the EO transducer 502, such as input to the EO transducer 502 by a waveguide (e.g., the waveguide 114 of FIG. 1). The optical device 506 may interpret optical output of the EO transducer 502, such as by detecting optical resonance splitting, detecting wavelengths of optical resonance splitting, etc. The optical device 506 may be controlled by or otherwise in communication with the computing device 510. The EO transducer 502 may be electrically controlled by an electrical controller 508. For example, the electrical controller 508 may provide a bias voltage, bias charge, etc. to a bias controller (e.g., the bias capacitor 124 of FIG. 1). The electrical controller 508 may be integrated into the EO transducer 502, the computing device 510, or another operational unit. The EO transducer 502 may receive microwave input and microwave output with the quantum computing device 504. The quantum computing device 504 may be a qubit, multiple qubits, including coupled, entangled, etc. qubits, or other units of quantum computing. The quantum qubit may output a microwave frequency, where the value of the microwave frequency may vary depending on the value of the qubit. The quantum computing device 504 may output a frequency (such as to the inductor 120 of FIG. 1) via inductive coupling with the EO transducer 502. The EO transducer 502 may likewise or instead input a frequency (such as via the inductor 120 of FIG. 1) inductively to the quantum computing device 504. The quantum computing device 504 may also be controlled (at least partially) or otherwise in communication with the computing device 510.

Figure 6:
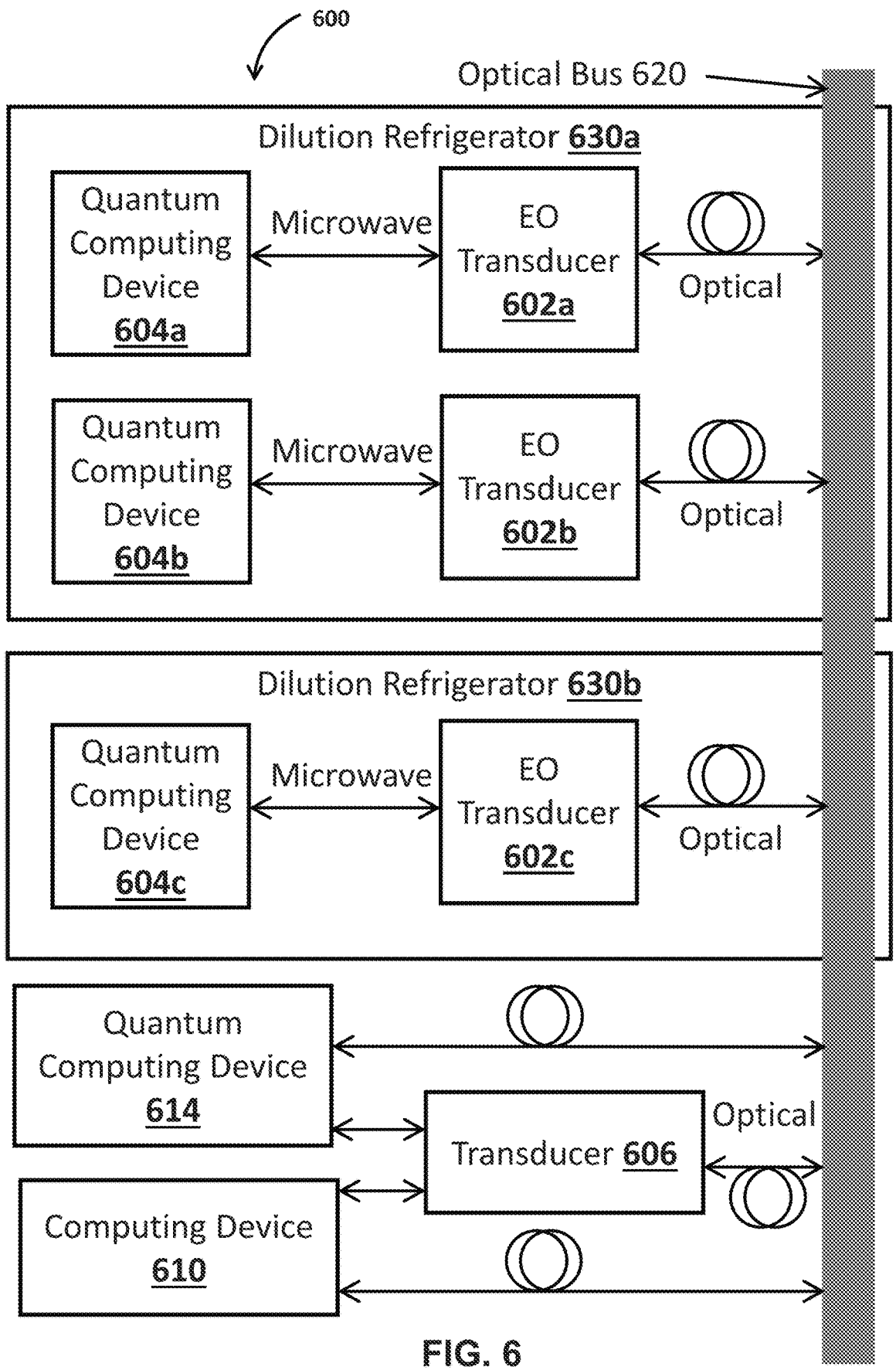
FIG. 6 is a system diagram that illustrates communication between quantum computing devices using example EO transducers, in accordance with one or more embodiments.

FIG. 6 is a system diagram 600 that illustrates example communication between quantum computing devices using example EO transducers 602. The system diagram depicts multiple dilution refrigerators 630a, 630b, which may be used to maintain temperatures of quantum computing device 604a-604b and 604c, respectively. EO transducer 602a-602b and 602c are depicted as being within the dilution refrigerators 630a and 630b respectively. The EO transducer 602a is depicted as being in communication via microwave with the quantum computing device 604a. The EO transducer 602b is depicted as being in communication via microwave with the quantum computing device 604b. The EO transducer 602a and the EO transducer 602b are depicted as being in communication with an optical bus 620, which is depicted as being at least partially within the dilution refrigerator 630a. The EO transducer 602c is depicted as being in communication via microwave with the quantum computing device 604c. The EO transducer 602c is further depicted as being in communication with the optical bus 620, which is depicted as being at least partially within the dilution refrigerator 630b. The optical bus 620 is further depicted as being in communication (optically) with a quantum computing device 614, which may be a quantum computing device 614 outside of a dilution refrigerator, and with a computing device 610. The optical bus 620 is also depicted as being in communication with a conventional transducer 606 (e.g., an optical to electrical transducer), and via the transducer 606 in communication with the quantum computing device 614 and the computing device 610. The EO transducer, by converting the microwave output of one or more quantum computing devices, to optical output (which has a longer coherence length) may be used to facilitate communication between quantum computing devices which are otherwise too separate to communicate (where communication may include quantum interference, entanglement, etc.). A quantum state or knowledge about a quantum state may be preserved in optical communication.

Terms used herein that describe a system when in use should not be read to exclude dormant versions of those systems. For example, reference to two components being "optically coupled" should not be read as requiring the system be energized with a source of optical energy, provided that optical coupling does occur when such energy is supplied in the appropriate manner. Similar reasoning applies to terms like "qubit," which can also refer to a device that has de-cohered after storing a qubit, and the term "superconducting," which can also refer to a room-temperature material that attains superconducting properties when cooled appropriately.

Figure 7:
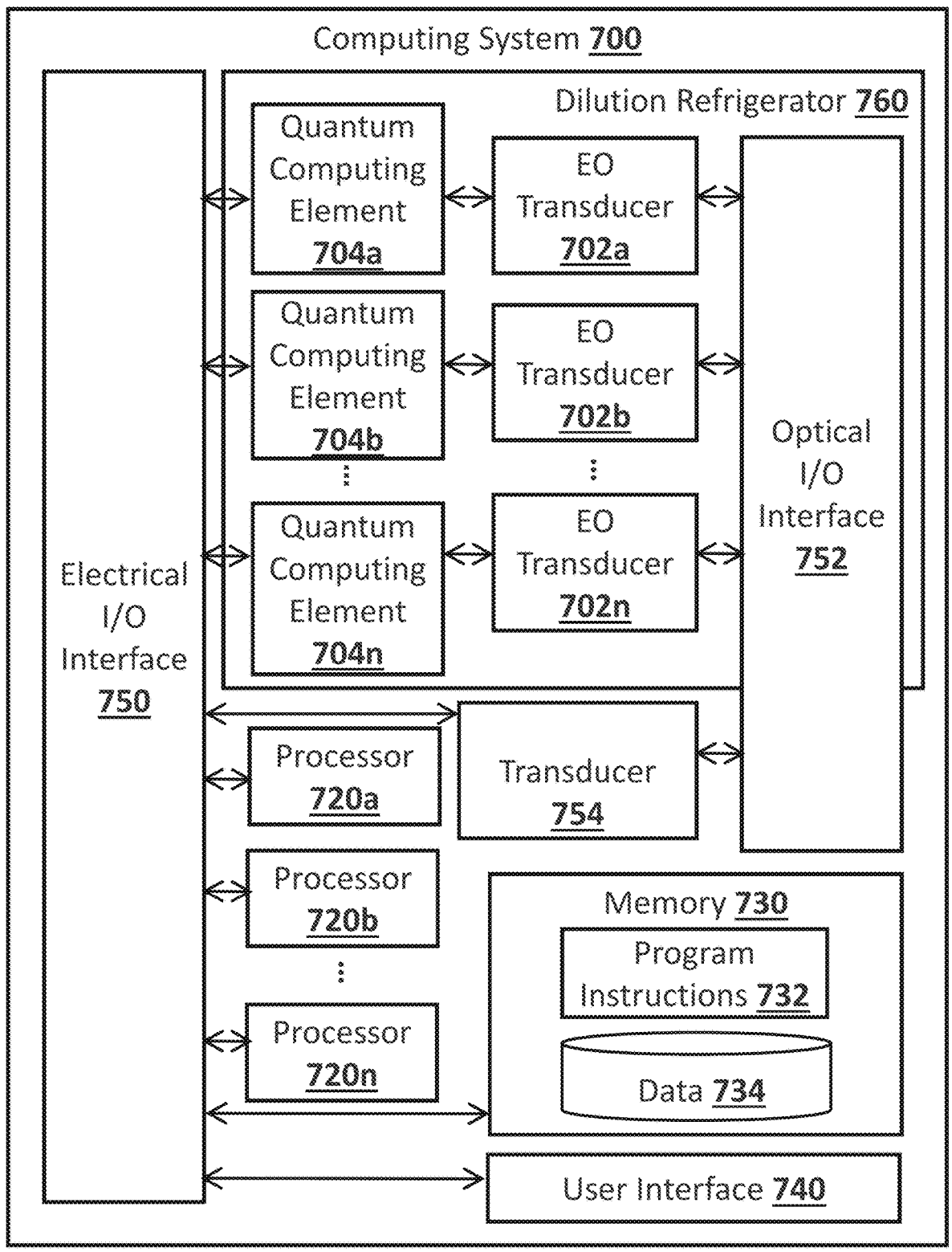
FIG. 7 is a system diagram that illustrates an example computing system comprising quantum qubits and example EO transducers, in accordance with one or more embodiments.

FIG. 7 is a system diagram that illustrates an example computing system 700 including qubits and example EO transducers, in accordance with one or more embodiments.

Various portions of systems and methods described herein may include or be executed on one or more computing systems similar to computing system 700. Further, processes and modules described herein may be executed by one or more processing systems similar to that of computing system 700. For example, quantum computing system 500 may execute operations using a processing system that is the same or similar to computing system 700.

Computing system 700 may include one or more processors (e.g., processors 720a-720n) coupled to system memory 730, and a user interface 740 via an electrical input/output (I/O) interface 750. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 730). Computing system 700 may be a uni-processor system including one processor (e.g., processor 720a-720n), or a multi-processor system including any number of suitable processors (e.g., 720a-720n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 700 may include a plurality of computing devices (e.g., distributed computing systems) to implement various processing functions.

Computing system 700 may include one or more quantum computing elements (e.g., quantum computing elements 704a-704n), coupled to system memory 730, and a user interface 740 via an electrical input/output (I/O) interface 750. Quantum computing elements 704a-704n may also be coupled to EO transducers 702a-702n, respectively, and to an optical I/O interface 751. The optical I/O interface may be coupled to the electrical I/O interface by a conventional transducer 754 (e.g., an electrical to optical transducer or set of devices to convert between electrical and optical signals). A quantum computing element may be a qubit, may include a single or multiple quantum computing elements. A quantum computing element may be a quantum processor, quantum storage, or other quantum computing devices. The quantum computing elements 704a-704n may be cooled by a dilution refrigeration 760. The optical I/O interface 752 may enable communication between elements (e.g., EO transducers 702a-702n) in one or more dilution refrigerator. A quantum computing device may execute program instructions (e.g., program instructions 732) or other elements stored in memory 730. Multiple quantum computing elements may be employed to provide for parallel or sequential execution of one or more portions of the techniques described herein.

The user interface 740 may comprise one or more I/O device interface 1030, for example to provide an interface for connection of one or more I/O devices to computing system 700. The user interface 740 may include devices that receive input (e.g., from a user) or output information (e.g., to a user). The user interface 740 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. The user interface 740 may be connected to computing system 700 through a wired or wireless connection. The user interface 740 may be connected to computing system 700 from a remote location. The user interface 740 may be in communication with one or more other computing systems. Other computing units, such as located on remote computer system, for example, may be connected to computing system 800 via a network.

System memory 730 may be configured to store program instructions 732 or data 734. Program instructions 732 may be executable by a processor (e.g., one or more of processors 720a-720n or one or more of quantum computing elements 704a-704n) to implement one or more embodiments of the present techniques. Program instructions 732 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 730 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard-drives), or the like. System memory 730 may include a non-transitory computer readable storage medium that may have program instructions stored thereon that are executable by a computer processor (e.g., one or more of processors 720a-720n or one or more of quantum computing elements 704a-704n) to cause the subject matter and the functional operations described herein. A memory (e.g., system memory 730) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

Electrical I/O interface 750 or optical I/O interface 752 (such as together with conventional transducer 754) may be configured to coordinate I/O traffic between processors 720a-720n, quantum computing elements 704a-704b, system memory 730, user interface 740. Electrical I/O interface 750 and/or optical I/O interface 752 may perform protocol, timing, or other data transformations to convert data signals from one component (e.g., system memory 730) into a format suitable for use by another component (e.g., processors 720a-720n or quantum computing elements 704a-704n). Electrical I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 700 or multiple computing systems 700 configured to host different portions or instances of embodiments. Multiple computing systems 700 may provide for parallel or sequential processing/execution of one or more portions of the techniques described herein.

Those skilled in the art will appreciate that computing system 700 is merely illustrative and is not intended to limit the scope of the techniques described herein. Computing system 700 may include any combination of devices or software that may perform or otherwise provide for the performance of the techniques described herein. For example, computing system 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 700 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 700 may be transmitted to computing system 700 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to cost constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

The description above includes example systems, methods, techniques, and/or program flows that embody aspects of the disclosure. However, it is understood that this disclosure may be practiced without these specific details. For instance, this disclosure refers to specific element dimensions and materials and to specific electromagnetic frequencies. The given dimensions, material properties, and frequencies and value and ranges of the like should be understood to be examples only, where such dimensions, material properties, and frequencies can vary, for example as much as +10%, and should be understood to represent a range of dimensions, material properties, and frequencies. In some cases, dimensions can vary up to 500% such as the gap between the waveguide and resonator which can vary between 100 μm and 500 μm±an additional 10%. Any range between A and B includes both points A and B within the range, or is inclusive of the endpoints of the range unless explicitly stated otherwise. It should also be understood that equal (e.g., =) includes substantially equation (e.g., ≅), such equal to measurement limits, equal to fabrication limits, etc. Additionally, this disclosure refers to quantum computing. Aspects of this disclosure can instead be applied to other optical or microwave frequency applications. Well-known instruction instances, protocols, structures and techniques have not been shown in detail in order not to obfuscate the description.

As used throughout this application, the word "may" is used in a permissive sense (i.e., meaning having the potential to), rather than the mandatory sense (i.e., meaning must). The words "include," "including," and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square," "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1.

What is claimed is:

1. An electro-optic transducer comprising:
   a first optical disk resonator and a second optical disk resonator, wherein the first optical disk resonator and the second optical disk resonator are optically coupled;
   a waveguide, the waveguide being optically coupled to at least one of the first optical disk resonator and the second optical disk resonator; and
   a resonator, the resonator being functionally coupled to at least a portion of the first optical disk resonator and the second optical disk resonator,
   wherein the first optical disk resonator and the second optical disk resonator have radii between 10 and 50 μm, thicknesses between 300 and 1000 nm, and are separated by between 100 and 500 nm;

wherein the waveguide is separated from the first optical disk resonator by between 100 and 500 nm, and has a width between 1 and 2 μm; and wherein an electrode of the resonator is separated from the first optical disk resonator and the second optical disk resonator by between 1 and 3 μm.

2. The electro-optic transducer of claim 1, wherein the resonator comprises an inductor and a capacitor, the inductor being electrically coupled to the capacitor and the capacitor being functionally coupled to at least a portion of the first optical disk resonator and the second optical disk resonator.

3. The electro-optic transducer of claim 1, wherein the resonator is a microwave resonator.

4. The electro-optic transducer of claim 1, further comprising a qubit, wherein the resonator is communicatively coupled to a qubit.

5. The electro-optic transducer of claim 4, wherein the qubit is a superconducting qubit.

6. The electro-optic transducer of claim 1, wherein the first optical disk resonator and the second optical disk resonator have a substantially similar resonant frequency $\omega_0$.

7. The electro-optic transducer of claim 6, the first optical disk resonator and the second optical disk resonator have split resonances at two frequencies $\omega_l$ and $\omega_u$.

8. The electro-optic transducer of claim 7, wherein the splitting comprises Autler-Townes splitting about a resonant frequency $\omega_0$.

9. The electro-optic transducer of claim 8, wherein the first optical disk resonator and the second optical disk resonator are configured to be detuned an input microwave frequency $\Omega_M$.

10. The electro-optic transducer of claim 9, wherein the detuning drives splitting with the relationship $\omega_u = \omega_l + \Omega_M$.

11. The electro-optic transducer of claim 2, wherein an electric field of the capacitor, when in use, passes through at least a portion of the first optical disk resonator and the second optical disk resonator.

12. The electro-optic transducer of claim 1, wherein the first optical disk resonator and the second optical disk resonators are whispering gallery mode resonators.

13. The electro-optic transducer of claim 1,
wherein the first optical disk resonator and the second optical disk resonator comprise aluminum nitride.

14. The electro-optic transducer of claim 2, wherein the capacitor comprises a first electrode and a second electrode, wherein the first electrode electrically contacts the first optical disk resonator and wherein the second electrode electrically contacts the second optical disk resonator;
wherein the first electrode and the second electrode are connected in parallel; and
wherein the capacitor comprises a superconducting material.

15. The electro-optic transducer of claim 14, wherein at least one of the capacitor and the inductor comprises niobium.

16. The electro-optic transducer of claim 2, further comprising a bias capacitor,
wherein the bias capacitor is capacitively coupled to at least one electrode of the capacitor and wherein the bias capacitor is configured to tune the first optical disk resonator and the second optical disk resonator.

17. The electro-optic transducer of claim 2, further comprising a top cladding,
wherein the inductor is separated from the first optical disk resonator and the second optical disk resonator by the top cladding;
wherein the top cladding is silicon dioxide; and
wherein the top cladding is between 400 and 500 nm in thickness.

18. A method for determining an output of a superconducting qubit,
the method comprising:
providing, by a waveguide, an optical frequency, to a first optical disk resonator,
wherein the first optical disk resonator is optically coupled to a second optical disk resonator,
wherein the first optical disk resonator and the second optical disk resonator have substantially similar resonant frequencies $\omega_0$, and
wherein the first optical disk resonator and the second optical disk resonator are functionally coupled to a microwave resonator;
detecting, via the waveguide, output of the first optical disk resonator; and
determining, based on the output, a microwave frequency $\Omega_M$ applied to the microwave resonator, wherein determining the microwave frequency applied to the microwave resonator comprises:
detecting, based on the output, a first frequency $\omega_l$ and a second frequency $\omega_u$, wherein the first frequency $\omega_l$ and the second frequency $\omega_u$ are split resonance frequencies about $\omega_0$;
determining the microwave frequency $\Omega_M$ applied to the microwave resonator by a relationship $\omega_u = \omega_l + \Omega_M$; and
determining an output of a qubit based on the determined microwave frequency $\Omega_M$.

19. The method of claim 18, wherein the qubit is coupled to the microwave resonator.

* * * * *